(12) United States Patent
Tomizawa et al.

(10) Patent No.: US 10,393,953 B2
(45) Date of Patent: Aug. 27, 2019

(54) LIGHT SOURCE DEVICE AND DISPLAY DEVICE

(71) Applicant: SAKAI DISPLAY PRODUCTS CORPORATION, Sakai-shi, Osaka OT (JP)

(72) Inventors: Hitoshi Tomizawa, Sakai (JP); Kazuya Idei, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 59 days.

(21) Appl. No.: 15/473,097

(22) Filed: Mar. 29, 2017

(65) Prior Publication Data

US 2017/0199316 A1 Jul. 13, 2017

Related U.S. Application Data

(63) Continuation of application No. PCT/JP2014/076942, filed on Oct. 8, 2014.

(51) Int. Cl.
*F21V 29/503* (2015.01)
*F21Y 105/00* (2016.01)
(Continued)

(52) U.S. Cl.
CPC ............ *G02B 6/009* (2013.01); *F21S 8/04* (2013.01); *F21V 29/503* (2015.01);
(Continued)

(58) Field of Classification Search
CPC ........ F21V 15/01; F21V 23/001; F21V 25/12; F21V 29/83; F21V 31/005; F21V 31/03; F21Y 2103/10; F21Y 2115/10
See application file for complete search history.

(56) References Cited

U.S. PATENT DOCUMENTS

| 8,794,779 B2 * | 8/2014 | Hayashi | G02B 6/0091 362/612 |
| 2006/0006777 A1 * | 1/2006 | Lo | G02B 6/0068 313/113 |

(Continued)

FOREIGN PATENT DOCUMENTS

| JP | 2006-269140 A | 10/2006 |
| JP | 2009-199871 A | 9/2009 |

(Continued)

OTHER PUBLICATIONS

Int'l. Search Report issued in Int'l. App. No. PCT/JP2014/076942, dated Nov. 25, 2014.

*Primary Examiner* — Tsion Tumebo
(74) *Attorney, Agent, or Firm* — Greer Burns & Crain, Ltd.

(57) ABSTRACT

A light source device includes: a light source section; a light guide plate; and a supporting member supporting the light source section so as to oppose a peripheral surface of the light guide plate. The light source section includes light sources and a light source substrate having a surface on which the light sources are mounted. The supporting member has an opposed surface opposing a rear surface of the light guide plate. The opposed surface has receptacles to allow the light source section to be attached so that the surface of the light source substrate opposes one end surface of the light guide plate. The receptacles are arranged so that the light source section can be attached to a selected receptacle, resulting in different separation distances between the light source section and the one end surface of the light guide plate.

5 Claims, 6 Drawing Sheets

(51) Int. Cl.
*F21Y 103/10* (2016.01)
*F21Y 115/10* (2016.01)
*F21V 8/00* (2006.01)
*F21S 8/04* (2006.01)
*G02F 1/1335* (2006.01)

(52) U.S. Cl.
CPC ......... *G02B 6/0068* (2013.01); *G02B 6/0085* (2013.01); *G02B 6/0091* (2013.01); *F21Y 2103/10* (2016.08); *F21Y 2105/00* (2013.01); *F21Y 2115/10* (2016.08); *G02F 1/133608* (2013.01)

(56) References Cited

U.S. PATENT DOCUMENTS

| | | | |
|---|---|---|---|
| 2009/0128732 A1 | 5/2009 | Hamada | |
| 2011/0149602 A1* | 6/2011 | Lee | G02B 6/009 362/612 |
| 2012/0188485 A1 | 7/2012 | Cheon | |
| 2012/0287666 A1* | 11/2012 | Kwon | G02F 1/133615 362/602 |
| 2013/0083559 A1* | 4/2013 | Oh | G02B 6/0088 362/612 |
| 2013/0093981 A1* | 4/2013 | Yu | G02F 1/133615 349/65 |
| 2013/0094241 A1* | 4/2013 | Yu | G02B 6/0091 362/602 |
| 2014/0003090 A1* | 1/2014 | Chang | G02B 6/0091 362/612 |

FOREIGN PATENT DOCUMENTS

| | | | |
|---|---|---|---|
| WO | WO 2007/129419 A1 | 11/2007 | |
| WO | 2012099001 A1 | 7/2012 | |

* cited by examiner

LIGHT SOURCE DEVICE AND DISPLAY DEVICE

This is a continuation of International Application No. PCT/JP2014/076942, with an international filing date of Oct. 8, 2014, the contents of which are hereby incorporated by reference.

BACKGROUND

1. Technical Field

The present invention relates to a light source device and display apparatus arranged so that light which is emitted from a light source section goes out through one surface of a light guide plate.

2. Description of the Related Art

A liquid crystal display apparatus includes a liquid crystal display panel and a light source device (see International Publication No. 2007/129419 (hereinafter "Patent Document 1"); and Japanese Laid-Open Patent Publication No. 2009-199871, (hereinafter "Patent Document 2")). Light source devices of edgelight type have been proposed. An edgelight-type light source device includes a light source section, a light guide plate, and an optical sheet group. The light source section includes a light source(s) and a light source substrate on which the light source(s) is mounted. The light source(s) is disposed opposite a peripheral surface of the light guide plate, and the light guide plate is disposed facing a rear surface of the liquid crystal display panel via the optical sheet group.

At the peripheral surface of the light guide plate, light which is emitted from the light source section enters the interior of the light guide plate. The light which has entered the interior of the light guide plate goes out from a frontal surface of the light guide plate. The light which has gone out from the frontal surface of the light guide plate undergoes diffusion, convergence, etc., as effected by the optical sheet group, to enter the interior of the liquid crystal display panel at the rear surface of the liquid crystal display panel. In other words, the liquid crystal display panel is illuminated by the light source device through the rear surface.

In a liquid crystal display apparatus which is described in Patent Document 1, an opening is made in a frame member that surrounds the liquid crystal display panel. Through this opening, the light source section (being described as a first substrate having LEDs thereon") is insertable into and detachable from the interior of the frame member. This allows the light source section to be exchanged.

In a liquid crystal display apparatus which is described in Patent Document 2, a light guide plate includes a light guide main body and a lightguiding section which are an integral piece, while a light source section includes light sources, a light source substrate, and a light source holder that holds the light source substrate. A slope with a predetermined taper angle is created in the lightguiding section, and protrusions to define a separation distance (clearance) between the light source and a peripheral surface of the light guide plate are provided on the light source holder. By allowing contact between the light source holder and the slope of the lightguiding section, an improved clearance precision is obtained.

In a liquid crystal display apparatus for use in relatively bright places (e.g., outdoors)(hereinafter referred to a display apparatus for bright places), the displaying region of the liquid crystal display panel is preferably brighter than that in a liquid crystal display apparatus for use in relatively dark places (e.g., indoors)(hereinafter referred to as a display apparatus for dark places). To realize this, a light source device which is used in the display apparatus for bright places needs to have a higher luminance than the luminance of a light source device which is used in the display apparatus for dark places.

In accordance with the liquid crystal display apparatus described in Patent Document 1, a display apparatus for bright places can be provided by inserting a high-luminance light source section through the opening in the frame member, whereas a display apparatus for dark places can be provided by inserting a low-luminance light source section. The higher the luminance of the light source section is, the higher the luminance of the light source device is. However, there is a problem of an increased number of component parts and an increased production cost because no common light source section is being shared between a display apparatus for bright places and a display apparatus for dark places.

In accordance with the liquid crystal display apparatus described in Patent Document 2, a display apparatus for bright places can be obtained when a light source section and a light guide plate with shorter clearance therebetween are used, whereas a display apparatus for dark places can be obtained when a light source section and a light guide plate with longer clearance therebetween are used. The shorter the clearance is, the higher the luminance of the light source device is. However, there is a problem of an increased number of component parts and an increased production cost because no common light source section and light guide plate are being shared between a display apparatus for bright places and a display apparatus for dark places.

SUMMARY

The present invention has been made in view of the above circumstances, and a main objective thereof is to provide a light source device and display apparatus that can be made into different types respectively featuring different luminances, without an increase in the number of component parts.

A light source device according to an embodiment of the present invention is a light source device comprising: a light source section; a light guide plate having a front surface through which light emitted from the light source section goes out; and a supporting member supporting the light source section so as to oppose a peripheral surface of the light guide plate, wherein, the light source section includes a plurality of light sources and a light source substrate, the light source substrate having a surface on which the plurality of light sources are mounted; the supporting member has an opposed surface opposing a rear surface of the light guide plate, the opposed surface having a plurality of receptacles provided thereon to allow the light source section to be attached so that the surface of the light source substrate opposes one end surface of the light guide plate; the plurality of receptacles are arranged so that the light source section being attached to each of the plurality of receptacles results in a different separation distance existing between the light source section and the one end surface of the light guide plate along a direction in which the light source section and the one end surface oppose each other; and the light source section is attached to one of the plurality of receptacles.

In one embodiment, the supporting member is a thermal release member to release heat which is emitted from the light source section.

In one embodiment, each of the plurality of receptacles is a recess in which the light source substrate is to be fitted in a detachable manner.

In one embodiment, the light source section further includes a heat conducting member to transmit heat which is emitted from the light source section, the heat conducting member being in contact with an opposite surface of the light source substrate from the surface on which the plurality of light sources are mounted; and each of the plurality of receptacles is a recess in which the heat conducting member is to be fitted in a detachable manner.

A display apparatus according to an embodiment of the present invention comprises: a light source device which has the above-described configuration; and a display panel to be illuminated through a rear surface thereof by the light source device.

In one embodiment according to the present invention, receptacles provided in plural places on the supporting member correspond to a plurality of different luminances of the light source device. If a manufacturer attaches the light source section to a receptacle in a place that results in a short separation distance between the light source section and the peripheral surface of the light guide plate (along the direction in which the light source section and the peripheral surface oppose each other), a light source device with high luminance is obtained. On the other hand, if the manufacturer attaches the light source section to a receptacle in a place that results in a long separation distance between the light source section and the peripheral surface of the light guide plate along the aforementioned direction, a light source device with low luminance is obtained.

Therefore, in order to obtain a light source device with high luminance and a light source device with low luminance, there is no need to use different light source sections, or combinations of different light source sections and a light guide plate. Stated otherwise, component parts are shared between a light source device with high luminance and a light source device with low luminance (or between a display apparatus including a light source device with high luminance and a display apparatus including a light source device with low luminance).

In one embodiment according to the present invention, since the light source section is attached to the supporting member, it is easy for the heat which is emitted from the light source section to be transmitted to the supporting member. Since the supporting member is also a thermal release member, there is no need to provide a separate thermal release member in addition to the supporting member. This allows the number of component parts to be reduced, and facilitates mass and size reduction of the light source device.

In one embodiment according to the present invention, the light source substrate of the light source section is detachably fitted in a receptacle, which may be a recess. Therefore, even after the light source section has been attached to the supporting member, the separation distance between the light source and the peripheral surface of the light guide plate along the direction in which the light source and the peripheral surface oppose each other can be changed. Moreover, the light source section is compact because it requires a minimum construction based on a light source and a light source substrate.

In one embodiment according to the present invention, the heat conducting member of the light source section is to be detachably fitted in a receptacle, which may be a recess. Therefore, even after the light source section has been attached to the supporting member, the separation distance between the light source and the peripheral surface of the light guide plate along the direction in which the light source and the peripheral surface oppose each other can be changed. Moreover, the heat conducting member contributes to efficient heat release from the light source section.

In accordance with the light source device and the display apparatus in one embodiment of the present invention, the manufacturer may select one from among receptacles that are provided in plural places, and attach the light source section in the selected receptacle to obtain a light source device of a desired luminance. Therefore, component parts can be shared among light source devices of different luminances (and between display apparatuses including light source devices of different luminances). Therefore, the number of component parts, and hence the production cost, can be reduced.

DETAILED DESCRIPTION

Hereinafter, the present invention will be described in detail, based on the figures illustrating embodiments thereof. The following description will rely on the definitions of UP/DOWN, FRONT/REAR, and RIGHT/LEFT indicated by the arrowheads in each figure.

Embodiment 1

Figure 1:
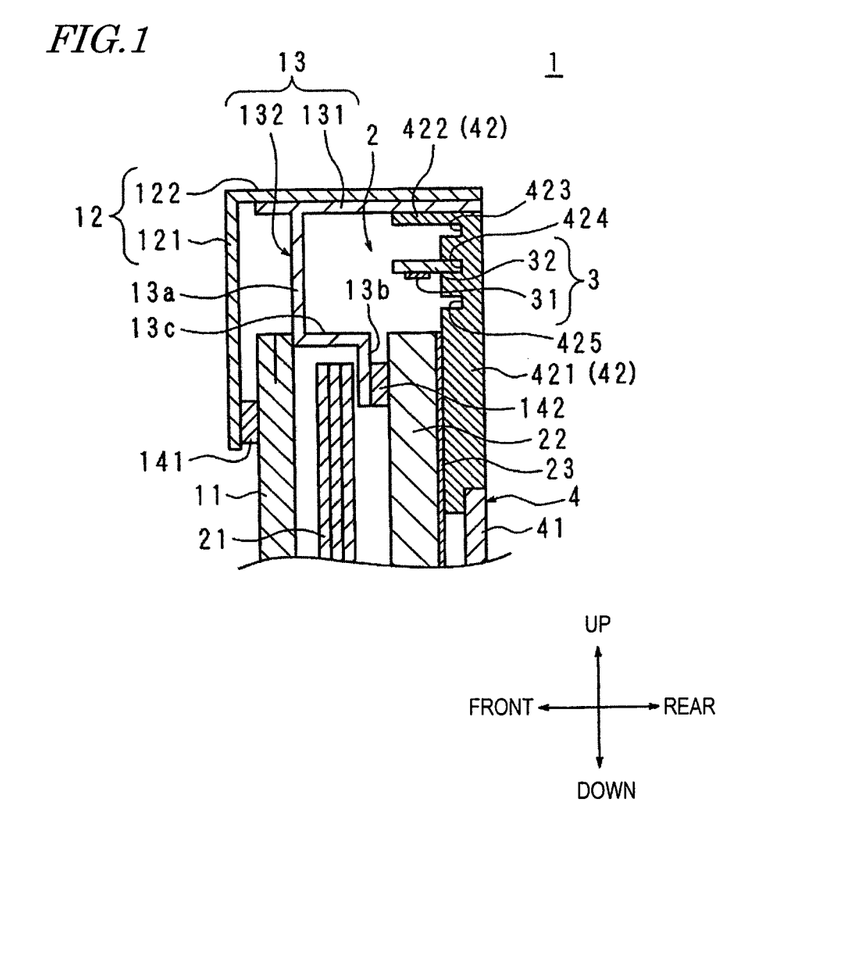
FIG. 1 is a cross-sectional view schematically showing an internal construction of a display apparatus which includes a light source device according to Embodiment 1 of the present invention.
Figure 2:
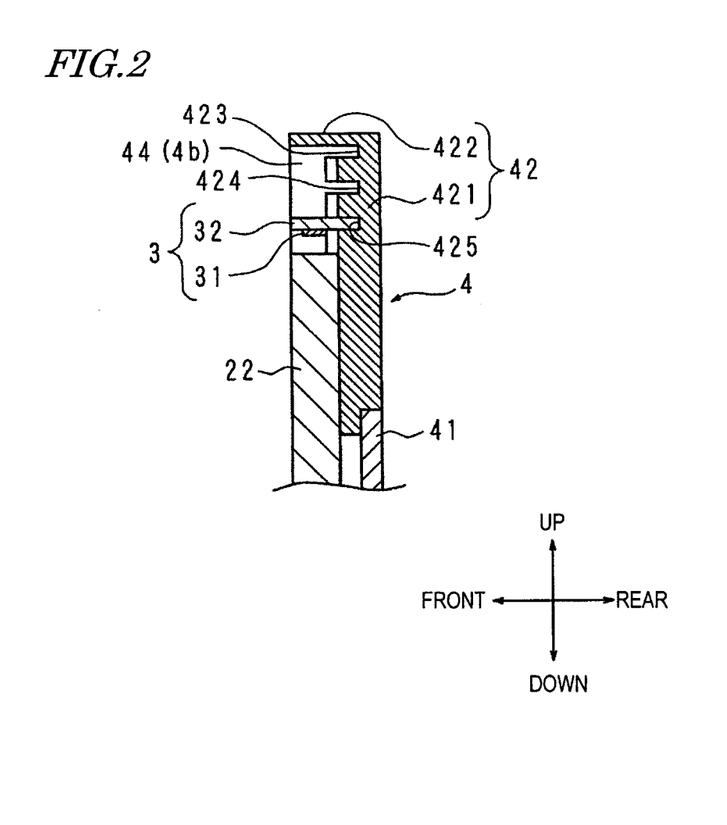
FIG. 2 is a schematic cross-sectional view for illustrating relative positioning between a light guide plate, a light source section, and a BL chassis which are included in the light source device.
Figure 3:
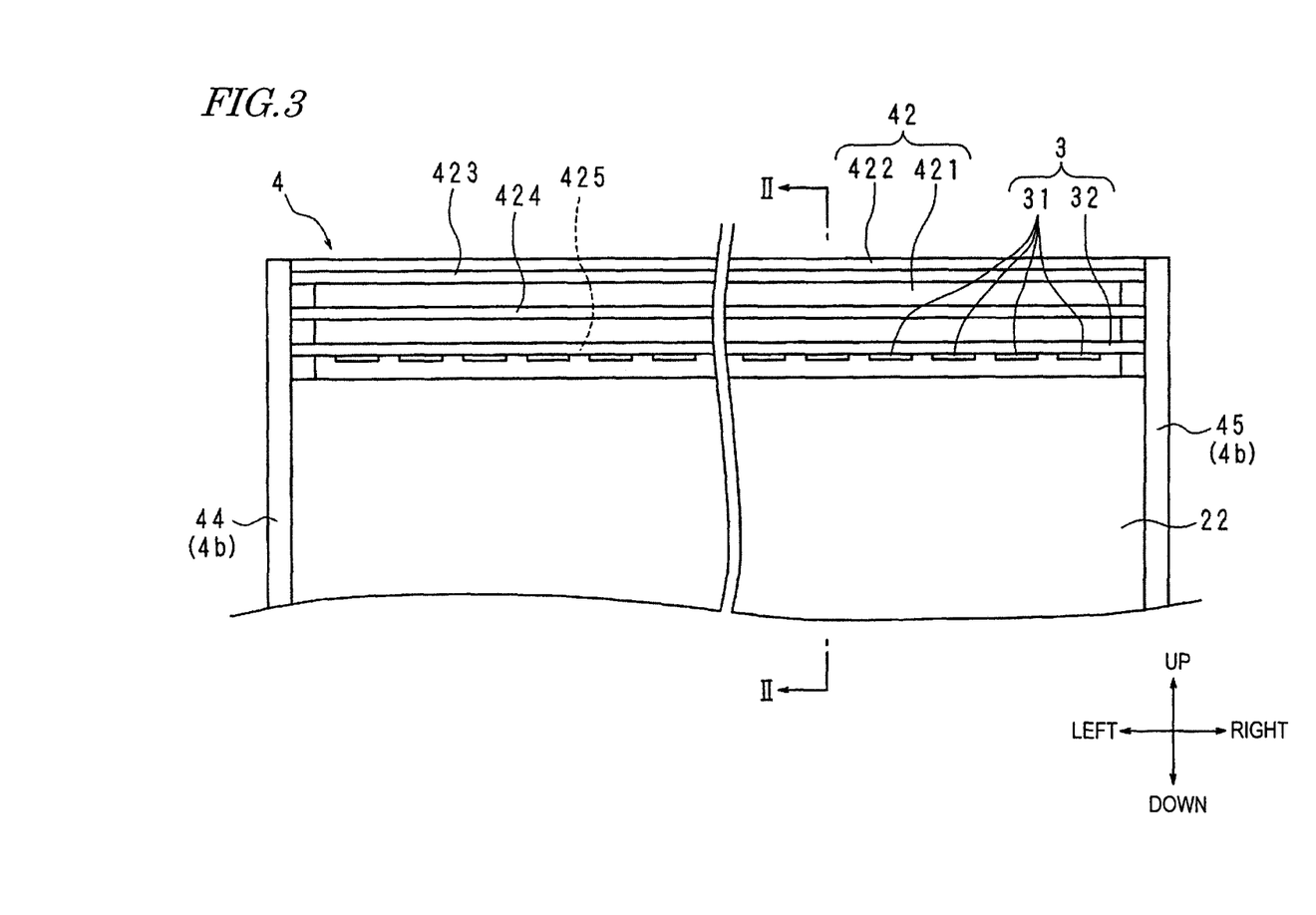
FIG. 3 is a schematic front view for illustrating relative positioning between the light guide plate, the light source section, and the BL chassis.
Figure 4:
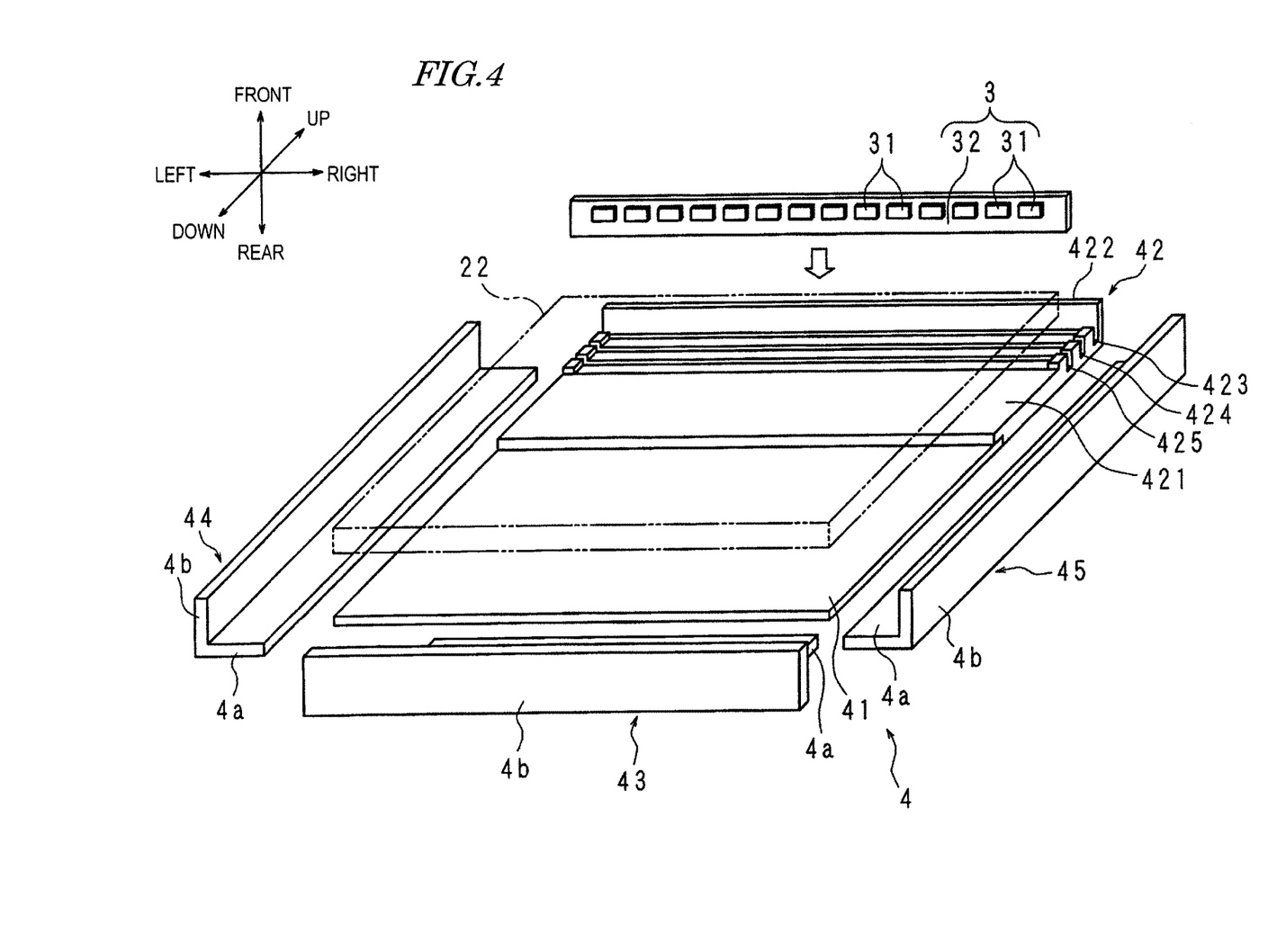
FIG. 4 is a schematic exploded perspective view for illustrating assembly of the light guide plate, the light source section, and the BL chassis.

FIG. 1 is a cross-sectional view schematically showing an internal construction of a display apparatus 1 which includes a light source device 2 according to Embodiment 1 of the present invention. FIG. 2 and FIG. 3 are a schematic cross-sectional view and a front view, respectively, for illustrating relative positioning between a light guide plate 22, a light source section 3, and a BL chassis 4 which are included in the light source device 2, where FIG. 2 is a cross-sectional view taken along line II-II in FIG. 3. FIG. 4 is a schematic exploded perspective view for illustrating assembly of the light guide plate 22, the light source section 3, and the BL chassis 4. The display apparatus 1 of the present embodiment is applicable to a television receiver, digital signage, or a monitor for a personal computer, for example.

First, components of the display apparatus 1 will be described. The display apparatus 1 includes a display panel 11, a bezel 12, a P chassis 13, cushioning members 141 and 142, and the light source device 2. The light source device 2 includes an optical sheet group 21, the light guide plate 22, a reflection sheet 23, the light source section 3, and the BL chassis 4. In FIG. 2 to FIG. 4, the reflection sheet 23 is omitted from illustration. The light source section 3 includes a plurality of LEDs 31, 31, . . . (i.e., light sources) and an LED substrate 32 (light source substrate). The BL chassis 4 includes a backboard 41, a heat sink 42, and angle brackets 43 to 45. In FIG. 1, the BL chassis 4 is only illustrated in summary form.

The display panel 11 is composed of a liquid crystal display panel. The display panel 11 is rectangular-shaped, and placed in portrait orientation. The display panel 11 includes a rectangular-shaped displaying region and a frame region having a rectangular frame shape that surrounds the displaying region. The display panel 11 includes a glass substrate at its frontal surface side and a glass substrate at its rear surface side, with liquid crystal being sealed in between the two glass substrates. Light transmittance of the display panel 11 changes in accordance with the voltage which is applied across the liquid crystal of the display panel 11.

The optical sheet group 21 of the light source device 2 is composed of a stack of a plurality of optical sheets each having a rectangular shape. Each optical sheet in the optical sheet group 21 has a light diffusion function or a light convergence function, etc. The optical sheet group 21 is disposed facing the display panel 11 from its rear surface side. The optical sheet group 21 covers the displaying region of the display panel 11, at the rear surface side of the display panel 11.

The light guide plate 22 has a rectangular plate shape. The light guide plate 22 is disposed facing the display panel 11 and the optical sheet group 21 from their rear surface side. The light guide plate 22 is arranged so that light which has entered the interior of the light guide plate 22 goes out from the front surface of the light guide plate 22. This is realized by a plurality of reflectors (not shown) which are provided on the rear surface of the light guide plate 22. Light which is incident on the reflectors is reflected toward the frontal surface.

The reflection sheet 23 has a rectangular shape. The front surface of the reflection sheet 23 is placed in close contact with the rear surface of the light guide plate 22. Therefore, light which has gone out from the rear surface of the light guide plate 22 is reflected by the reflection sheet 23, so as to again enter the interior of the light guide plate 22.

The light source section 3 is located above the light guide plate 22. The LED substrate 32 is composed of a synthetic resin, and has a rectangular shape which is in landscape orientation, i.e., being longer along the right-left direction. The lower surface of the LED substrate 32 is disposed opposite the upper end surface of the light guide plate 22. The LEDs 31, 31, . . . are mounted on the lower surface of the LED substrate 32, at equal intervals in a row along the right-left direction. The LEDs 31, 31, . . . are disposed opposite the upper end surface of the light guide plate 22, at a certain distance therebetween. The light source section 3 is compact because it requires a minimum construction based on the LEDs 31, 31, . . . and the LED substrate 32.

Instead of the light source section 3, the light source device 2 may include a plurality of light source sections. For example, two light source sections may be provided, respectively above and below the light guide plate 22, or respectively on the right and the left of the light guide plate 22. Alternatively, one light source section may be provided either below or on the right or left of the light guide plate 22.

The bezel 12 has a front face portion 121 and a side face portion 122. The front face portion 121 has a rectangular frame shape covering over the frame region of the display panel 11 from its frontal surface side, such that the displaying region of the display panel 11 is exposed through an opening in the rectangular frame. The side face portion 122 has a rectangular barrel shape, protruding rearward from the outer periphery of the front face portion 121.

The P chassis 13 is located more toward the rear surface side than is the front face portion 121 of the bezel 12, while also being inside of the side face portion 122. The P chassis 13 includes a base section 131 and a spacer section 132. The base section 131 constitutes a rectangular barrel shape along the front-rear direction, while being covered by the side face portion 122 on the bezel 12 on the outside.

The spacer section 132 includes first to third framing pieces 13a to 13c. The first framing piece 13a protrudes orthogonally from the base section 131, and is in contact with the rear surface of the frame region of the display panel 11. Via the rectangular frame-shaped cushioning member 141, the display panel 11 is sandwiched between the front face portion 121 of the bezel 12 and the spacer section 132 of the P chassis 13. The second framing piece 13b is disposed facing one of the four edges of the light guide plate 22, on its frontal surface side. The third framing piece 13c, which is provided in a direction intersecting both of the first and second framing pieces 13a and 13b, connects the first and second framing pieces 13a and 13b.

The spacer section 132 allows a gap to be created between the display panel 11 and the light guide plate 22, such that the optical sheet group 21 is accommodated within this gap. The optical sheet group 21 may be attached, e.g., at its upper edge, to the spacer section 132.

The BL chassis 4 has a rectangular dish shape. The backboard 41 is a metal plate which constitutes part of a bottom wall of the rectangular dish of the BL chassis 4. The backboard 41 is disposed facing, if at all, anything but the upper edge of the reflection sheet 23 from its rear surface side.

The heat sink 42 is a metal member having an L-shaped cross section and including a light source supporting portion 421 and a side wall portion 422. The light source supporting portion 421 has a rectangular wall shape which is in portrait orientation. A lower portion of the light source supporting portion 421 is disposed facing the upper edge of the reflection sheet 23 from its rear surface side. Via the cushioning member 142, the light guide plate 22 and the reflection sheet 23 are sandwiched between the spacer section 132 of the P chassis 13 and the lower portion of the light source supporting portion 421.

Receptacles 423 to 425 are made in plural places (e.g., three places in the present embodiment) in an upper portion of the light source supporting portion 421, such the light source section 3 is attachable to any of the receptacles 423 to 425. Each of the receptacles 423 to 425 is a recess in the shape of a groove extending along the right-left direction and being made in the front surface of the light source supporting portion 421. The receptacles 423 to 425 form a series in this order, from above to below. The rear edge of the LED substrate 32 of the light source section 3 is to be fitted into one of the three receptacles 423 to 425. The fitting between the LED substrate 32 and each of the receptacles 423 to 425 is detachable.

When the light source section 3 is attached to the receptacle 423 (not shown), the LEDs 31, 31, . . . are disposed opposite the upper end surface of the light guide plate 22, so as to be distanced therefrom along the up-down direction by the longest distance. When the light source section 3 is attached to the receptacle 424 as illustrated in FIG. 1, the LEDs 31, 31, . . . are disposed opposite the upper end surface of the light guide plate 22, so as to be distanced therefrom along the up-down direction by an intermediate distance. When the light source section 3 is attached to the receptacle 425 as illustrated in FIG. 2 and FIG. 3, the LEDs 31, 31, . . . are disposed opposite the upper end surface of the light guide plate 22, so as to be distanced therefrom along the up-down direction by the shortest distance.

The heat which is emitted from the LEDs 31, 31, . . . of the light source section 3 being attached to any of the receptacles 423 to 425 is transmitted to the light source supporting portion 421 via the LED substrate 32. In other words, the heat sink 42 serves the function of a supporting member which supports the light source section 3 so as to oppose the upper end surface (peripheral surface) of the light guide plate 22, and the function of a thermal release member which releases the heat that is emitted from the light source section 3. Therefore, as compared to the case where a supporting member and a thermal release member are separately provided, the number of component parts is reduced and also mass and size reduction is achieved.

The lower edge of the light source supporting portion 421 is attached to the upper edge of the backboard 41. Together with the backboard 41, the light source supporting portion 421 constitutes the bottom wall of the rectangular dish of the BL chassis 4.

The side wall portion 422 has a rectangular shape which is in landscape orientation, protruding orthogonally toward the frontal surface at the upper edge of the light source supporting portion 421. The side wall portion 422 is attached to the inner surface of the base section 131 of the P chassis 13, at a position which is closer toward the rear surface side from where the spacer section 132 of the P chassis 13 protrudes. The side wall portion 422 constitutes one side wall of the rectangular dish of the BL chassis 4.

The angle bracket 43 is a metal member having an L-shaped cross section, including a first wall portion 4a and a second wall portion 4b each having a rectangular shape. The first wall portion 4a of the angle bracket 43 is attached to the lower edge of the backboard 41, oriented so that one edge thereof extends along the lower edge of the backboard 41. At another edge of the first wall portion 4a, the second wall portion 4b of the angle bracket 43 protrudes orthogonally toward the frontal surface. The second wall portion 4b is attached to the inner surface of the base section 131 of the P chassis 13, at a position which is closer toward the rear surface side from where the spacer section 132 of the P chassis 13 protrudes. The second wall portion 4b constitutes one side wall (and more particularly, a side wall opposing the one side wall constituted by the side wall portion 422 of the heat sink 42) of the rectangular dish of the BL chassis 4.

Angle brackets 44 and 45 are similar in construction to the angle bracket 43. The angle brackets 44 and 45 are attached to the left edge and right edge, respectively, of the backboard 41 and to the left edge and right edge, respectively, of the light source supporting portion 421 of the heat sink 42, constituting the other two side walls of the rectangular dish of the BL chassis 4.

Next, illumination of the display panel 11 by the light source device 2 will be described. Light which is emitted from the light source section 3 enters the interior of the light guide plate 22 at the upper end surface of the light guide plate 22. A portion of the light having entered the interior of the light guide plate 22 is reflected by the front surface, the rear surface, or the reflectors, etc., of the light guide plate 22, until eventually going out from the front surface toward the optical sheet group 21. Another portion of the light having entered the interior of the light guide plate 22 goes out from the rear surface of the light guide plate 22, and is reflected by the reflection sheet 23 to again enter the interior of the light guide plate 22.

The light which has gone out toward the optical sheet group 21, undergoes diffusion, convergence, etc., by the optical sheet group 21, and enters the interior of the display panel 11 at the rear surface of the display panel 11. Thus, the display panel 11 is illuminated by the light source device 2 through its rear surface. The light which has entered the interior of the display panel 11 is either allowed or disallowed to be transmitted through the display panel 11, whereby an image is displayed in the displaying region of the display panel 11.

Next, luminance alterations in the light source device 2 will be described. Luminance of the light source device 2 depends on which one of the receptacles 423 to 425 of the heat sink 42 the light source section 3 was attached to during the assembly of the display apparatus 1. If the light source section 3 was attached to the receptacle 423 (or to the receptacle 425), then the separation distance between the LEDs 31, 31, . . . of the light source section 3 and the light guide plate 22 is longest (or shortest), and therefore the luminance of the light source device 2 is lowest (or highest). If the light source section 3 was attached to the receptacle 424, then the separation distance between the LEDs 31, 31, . . . of the light source section 3 and the light guide plate 22 is intermediate, and therefore the luminance of the light source device 2 is intermediate. As the light source device 2 has a higher luminance or a lower luminance, the displaying region of the display panel 11 becomes brighter or darker.

Therefore, when producing a display apparatus 1 for bright places (or for dark places), the manufacturer may attach the light source section 3 to the receptacle 425 (or the receptacle 423) of the heat sink 42. Alternatively, not necessary in terms of for-bright-places or for-dark-places, but the light source section 3 may be attached to the receptacle 425, the receptacle 424, or the receptacle 423 of the heat sink 42 depending on whether the brightness of the displaying region of the display panel 11 as desired by the user of the display apparatus 1 is bright, intermediate, or dark. Even after the display apparatus 1 has been assembled, the display apparatus 1 may be temporarily disassembled to change the position at which the light source section 3 is attached, and then reassembled, whereby the luminance of the light source device 2, and hence the brightness of the displaying region of the display panel 11, can be altered.

From what is described above, all component parts can be shared among any number of light source devices 2, 2, . . . with different luminances, and among any number of display apparatuses 1, 1, . . . in which the displaying region of the display panel 11 has different brightnesses. This allows the number of component parts to be reduced, and thus the production cost to be reduced.

Incidentally, each of the liquid crystal display apparatus described in Patent Documents 1 and 2 possesses only one predetermined clearance, thus not allowing for freedom of selection. On the other hand, in the display apparatus 1 and the light source device 2 according to the embodiment, it is possible to choose from several predetermined clearance values. Moreover, the light guide plate which is included in the liquid crystal display apparatus of Patent Document 2 requires a lightguiding section having a predetermined taper angle. On the other hand, the light guide plate 22 according to the embodiment has no such constraints regarding its shape, thus providing more design freedom.

Embodiment 2

Figure 5:
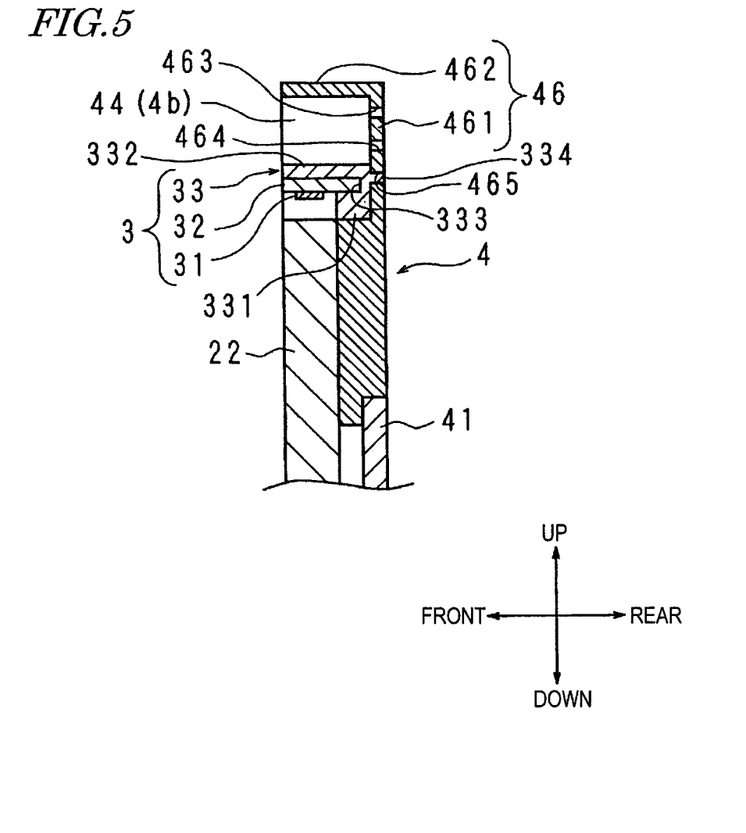
FIG. 5 is a schematic cross-sectional view for illustrating relative positioning between a light guide plate, a light source section, and a BL chassis which are included in a light source device according to Embodiment 2 of the present invention.
Figure 6:
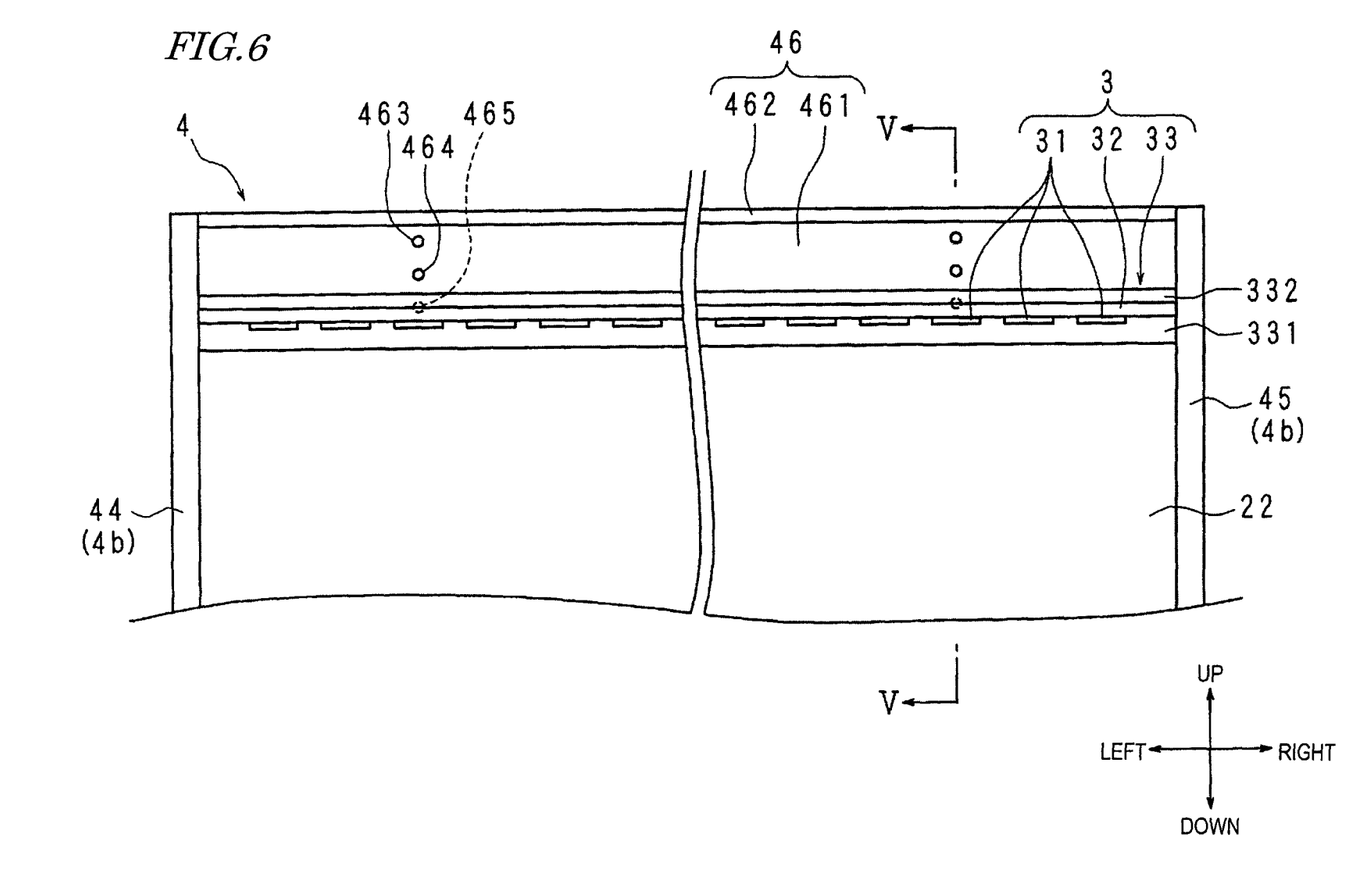
FIG. 6 is a schematic front view for illustrating relative positioning between the light guide plate, the light source section, and the BL chassis.

FIG. 5 and FIG. 6 are a schematic cross-sectional view and a front view for illustrating relative positioning between a light guide plate 22, a light source section 3, and a BL chassis 4 which are included in a light source device 2 according to Embodiment 2 of the present invention. FIG. 5 and FIG. 6 correspond to FIG. 2 and FIG. 3 of Embodiment 1, respectively. FIG. 5 is a cross-sectional view taken along line V-V in FIG. 6. The light source device 2 of the present embodiment is substantially similar in construction to the light source device 2 of Embodiment 1. Hereinafter, differences from Embodiment 1 will be described, while any portion having a corresponding counter in Embodiment 1 will be denoted by an identical reference numeral, with its description being omitted.

The light source section 3 includes LEDs 31, 31, . . . , an LED substrate 32, and a heat conducting member 33. The LEDs 31, 31, . . . and the LED substrate 32 are identical those of Embodiment 1. The heat conducting member 33 is a metal member having a similar thermal conductivity to that of a generic heat sink. The heat conducting member 33 includes a substrate attaching portion 331 and a substrate reinforcement 332.

The substrate attaching portion 331 has a rectangular rod shape extending along the right-left direction. In a central portion of the front surface of the substrate attaching portion 331 along the up-down direction, an attachment recess 333 is provided which is in the shape of a groove extending along the right-left direction. The rear edge of the LED substrate 32 of the light source section 3 is fitted in the attachment recess 333. The fitting between the LED substrate 32 and the attachment recess 333 may be detachable or non-detachable. From a central portion of the rear surface of the substrate attaching portion 331 along the up-down direction, two attachment bumps 334, 334 (only one of which is shown in FIG. 5), which are disposed apart along the right-left direction, protrude. Each attachment bump 334 has a cylindrical shape lying on its side along the front-rear direction.

The substrate reinforcement 332 has a rectangular wall shape which is in landscape orientation, and protrudes from an upper portion of the front surface of the substrate attaching portion 331, along the periphery of the opening defining the attachment recess 333. The upper surface of the LED substrate 32 when being fitted into the attachment recess 333 is in contact with the substrate reinforcement 332. As a result, even if an external force acts on the LED substrate 32, deformation such as flexure or torsion of the LED substrate 32 is suppressed.

Instead of the heat sink 42 in Embodiment 1, the BL chassis 4 includes a heat sink 46. The heat sink 46 is a metal member having an L-shaped cross section, which includes a light source supporting portion 461 corresponding to the light source supporting portion 421 in Embodiment 1 and a side wall portion 462 similar to the side wall portion 422 in Embodiment 1. The light source supporting portion 461 has receptacles 463 to 465. The receptacles 463 to 465 correspond to the receptacles 423 to 425 in Embodiment 1, although each of the receptacles 463 to 465 consists of two recesses in the form of throughholes in the front surface of the light source supporting portion 461, which are disposed apart along the right-left direction and correspond to the attachment bumps 334, 334 of the heat conducting member 33 of the light source section 3.

When the display apparatus 1 is to be assembled, the attachment bumps 334, 334 of the heat conducting member 33 of the light source section 3 are fitted in one of the receptacles 463 to 465. The fitting between the attachment bumps 334, 334 and the receptacles 463 to 465 is detachable. The heat which is emitted from the LEDs 31, 31, . . . of the light source section 3 being attached to one of the receptacles 463 to 465 is transmitted, via the LED substrate 32 and the heat conducting member 33, to the light source supporting portion 461.

The heat conducting member 33 contributes to efficient heat release associated with the LEDs 31, 31, . . . . Also, the heat conducting member 33 reinforces the LED substrate 32, which is generally susceptible to deformation such as flexure or torsion. When attaching or detaching the light source section 3 to or from the heat sink 46, the manufacturer may hold the heat conducting member 33, which is composed of a metal and therefore is highly rigid, instead of the LED substrate 32, which is poorly rigid because of being composed of a synthetic resin. This restrains unwanted external forces from being applied to the LED substrate 32 to cause deformation of the LED substrate 32.

Luminance of the light source device 2 depends on which one of the receptacles 463 to 465 of the heat sink 46 the light source section 3 was attached during the assembly of the display apparatus 1. Therefore, the display apparatus 1 and light source device 2 can provide similar actions and effects to those of the display apparatus 1 and light source device 2 according to Embodiment 1. Although Embodiments 1 and 2 illustrate examples where the receptacles according to the embodiments of the present invention are recesses, this is not a limitation. For example, each receptacle may be a protrusion, and a recess in which this protrusion is to be detachably fitted may be provided in the light source section. Alternatively, the receptacle may be a sandwiching section to sandwich the light source section in a detachable manner.

A light source device according to an embodiment of the present invention is not limited to a light source device 2 to be incorporated in a display apparatus 1. For example, a light source device may be constructed as a backlight unit of a display section of a mobile phone, a personal digital assistant, or the like. Alternatively, a light source device may be constructed as a ceiling light, a wall-mounted illumination device, or the like.

In all aspects, the embodiments disclosed herein are to be considered illustrative rather than restrictive. Rather than the aforementioned, it is intended that the scope of the present invention encompasses any and all modifications within the scope of the claims and the equivalents thereof. So long as the effects of the present invention are preserved, any component elements that are not disclosed in Embodiments 1 and 2 may be included in the display apparatus 1 or the light source device 2. The constituent elements (technological features) disclosed in each embodiment may be combined, and any such combination may result in a new technological feature.

What is claimed is:

1. A light source device for a display apparatus, the display apparatus having a chassis and a backboard, the light source device comprising:
   a light source section;
   a light guide plate having a front surface through which light emitted from the light source section goes out; and
   a supporting member supporting the light source section so as to oppose a peripheral surface of the light guide plate, the supporting member being attached to the chassis on one end and the backboard on another end, wherein, the light source section includes a plurality of light sources and a light source substrate, the light source substrate having a surface on which the plurality of light sources are mounted;

the supporting member has an opposed surface opposing a rear surface of the light guide plate, the opposed surface having a plurality of receptacles provided thereon to allow the light source section to be attached so that the surface of the light source substrate opposes one end surface of the light guide plate;

the plurality of receptacles are arranged so that the light source section being attached to each of the plurality of receptacles results in a different separation distance existing between the light source section and the one end surface of the light guide plate along a direction in which the light source section and the one end surface oppose each other; and the light source section is attached to one of the plurality of receptacles, the display apparatus being capable of temporary disassembly to change the position of the light source section in the receptacles.

2. The light source device of claim 1, wherein the supporting member is a thermal release member to release heat which is emitted from the light source section.

3. The light source device of claim 1, wherein each of the plurality of receptacles is a recess in which the light source substrate is to be fitted in a detachable manner.

4. The light source device of claim 1, wherein, the light source section further includes a heat conducting member to transmit heat which is emitted from the light source section, the heat conducting member being in contact with an opposite surface of the light source substrate from the surface on which the plurality of light sources are mounted; and each of the plurality of receptacles is a recess in which the heat conducting member is to be fitted in a detachable manner.

5. A display apparatus comprising:

the light source device of claim 1; and a display panel to be illuminated through a rear surface thereof by the light source device.

* * * * *